United States Patent
Rajaram et al.

(10) Patent No.: US 12,531,827 B2
(45) Date of Patent: Jan. 20, 2026

(54) SYSTEMS AND METHODS FOR REAL-TIME, INTELLIGENT, AND COORDINATED MESSAGING FOR INTER-APPLICATION COMMUNICATIONS USING THESE DYNAMIC REQUESTS

(71) Applicant: Capital One Services, LLC, McLean, VA (US)

(72) Inventors: Manikandan Rajaram, Ashburn, VA (US); St. John Graham P. Hill, Great Falls, VA (US)

(73) Assignee: Capital One Services, LLC, McLean, VA (US)

(*) Notice: Subject to any disclaimer, the term of this patent is extended or adjusted under 35 U.S.C. 154(b) by 104 days.

(21) Appl. No.: 18/641,196

(22) Filed: Apr. 19, 2024

(65) Prior Publication Data

US 2025/0330440 A1    Oct. 23, 2025

(51) Int. Cl.
*H04L 51/56*    (2022.01)
*H04L 51/063*    (2022.01)
*H04L 51/066*    (2022.01)

(52) U.S. Cl.
CPC ............ *H04L 51/56* (2022.05); *H04L 51/063* (2013.01); *H04L 51/066* (2013.01)

(58) Field of Classification Search
CPC ....... H04L 51/02; H04L 51/06; H04L 51/063; H04L 51/066; H04L 51/21; H04L 51/214; H04L 51/56
See application file for complete search history.

(56) References Cited

U.S. PATENT DOCUMENTS

2025/0202849 A1*   6/2025   Pal .................. H04L 51/066

* cited by examiner

*Primary Examiner* — Vivek Srivastava
*Assistant Examiner* — William C McBeth
(74) *Attorney, Agent, or Firm* — Foley & Lardner LLP (57) ABSTRACT

Systems and methods for a dynamic communication coordination system based on intelligent and personalized communications. For example, as opposed to a conventional routing system, where the router receives a communication and determines an intended recipient as defined by the communication, the system described herein receives a communication and processes the data in that communication using a standardizing relay. The standardizing relay may then determine where to send the communication.

20 Claims, 4 Drawing Sheets

SYSTEMS AND METHODS FOR REAL-TIME, INTELLIGENT, AND COORDINATED MESSAGING FOR INTER-APPLICATION COMMUNICATIONS USING THESE DYNAMIC REQUESTS

BACKGROUND

In cloud computing systems, communications between applications are often routed using a combination of networking technologies, protocols, and architectural patterns designed to ensure reliable, scalable, and secure communication. Cloud platforms often provide messaging services that act as intermediaries to manage the communications between different applications or components. Typically, these communications comprise requests and replies. This pattern involves a direct request to a service and waiting for a response and are commonly implemented using HTTP/HTTPS protocols. To direct requests and replies, cloud computing systems typically rely on a generated communication to have an intended recipient. That is, the communication itself indicates where the communication should be directed. The transmitting application or component then routes the communication to that intended recipient.

SUMMARY

Systems and methods are described herein for novel uses and/or improvements to communication exchange in cloud systems using real-time, intelligent, and coordinated messaging. As one example, systems and methods are described herein that do not rely on static protocols that rely on a designated recipient to transmit communications. Instead, the systems and methods provide a dynamic communication coordination system based on intelligent and personalized communications. For example, as opposed to a conventional routing system, where the router receives a communication and determines an intended recipient as defined by the communication, the system described herein receives a communication and processes the data in that communication using a standardizing relay. The standardizing relay may then determine where to send the communication.

As an example, the standardizing relay may connect all servicing channels for a platform and its applications and components. As communications are transmitted between components, the standardizing relay may detect communication characteristics such as user identifiers, account identifiers, and time stamps in communication. The standardizing relay may also detect key values that determine what input characteristics should be used when the standardizing relay processes the communication. As opposed to an internet protocol (IP) address, which indicates a location on a network, or a Media Access Control (MAC) address, which indicates specific hardware, the key value provides information to the standardizing relay that uses a protocol specific to the standardizing relay.

For example, the standardizing relay may use the key values to determine formats of the input, objectives of the inputs, specific rules to apply, and/or formats to be used for inputs to the standardizing relay. The standardizing relay may then apply a series of rules that interpret the key values to determine how to process the communication, where to send the communication for processing, and/or what processes to perform on the communication. Having interpreted the key values according to the series of rules, the standardizing relay may transmit an interpreted output to a generative artificial intelligence model, which composes dynamic requests for inter-application communications within the system.

However, using real-time, intelligent, and coordinated messaging for inter-application communications using these dynamic requests raises a novel technical problem. Specifically, the standardizing relay must be able to generate the dynamic requests in real-time without creating bottlenecks with the broader system. This is particularly problematic as the requests become more numerous, the systems become more complex, and/or the amount of data in a given communication that requires interpretation increases. Accordingly, the standardizing relay comprises a vector database, which data received by, used by, and/or transmitted is in a vector format. By using the vector format, the standardizing relay may be more easily integrated to system applications and components as well as facilitate the use of a broader number and type of models. For example, without this, the reformatting tasks and standardized would prevent efficient distribution.

In some aspects, systems and methods for generating dynamic requests and responses for inter-application communication without predetermined recipients within cloud computer networks are described. The system may receive, at a standardizing relay, a first communication from a first component in a cloud computer network, wherein the first communication has an undesignated recipient. The system may determine, at the standardizing relay, a first communication characteristic. The system may determine, at the standardizing relay, a first key value, wherein the first key value uses a vector-based protocol specific to the standardizing relay. The system may process, at the standardizing relay, the first key value using a relay rule set in a vector database to generate a first feature of a first feature input. The system may generate, at the standardizing relay, a second feature for the first feature input based on the first communication characteristic. The system may input the first feature input into a generative artificial intelligence model to generate a first output. The system may generate a first dynamic request corresponding to the first communication based on the first output, wherein the first dynamic request designates a second component in the cloud computer network as a recipient.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
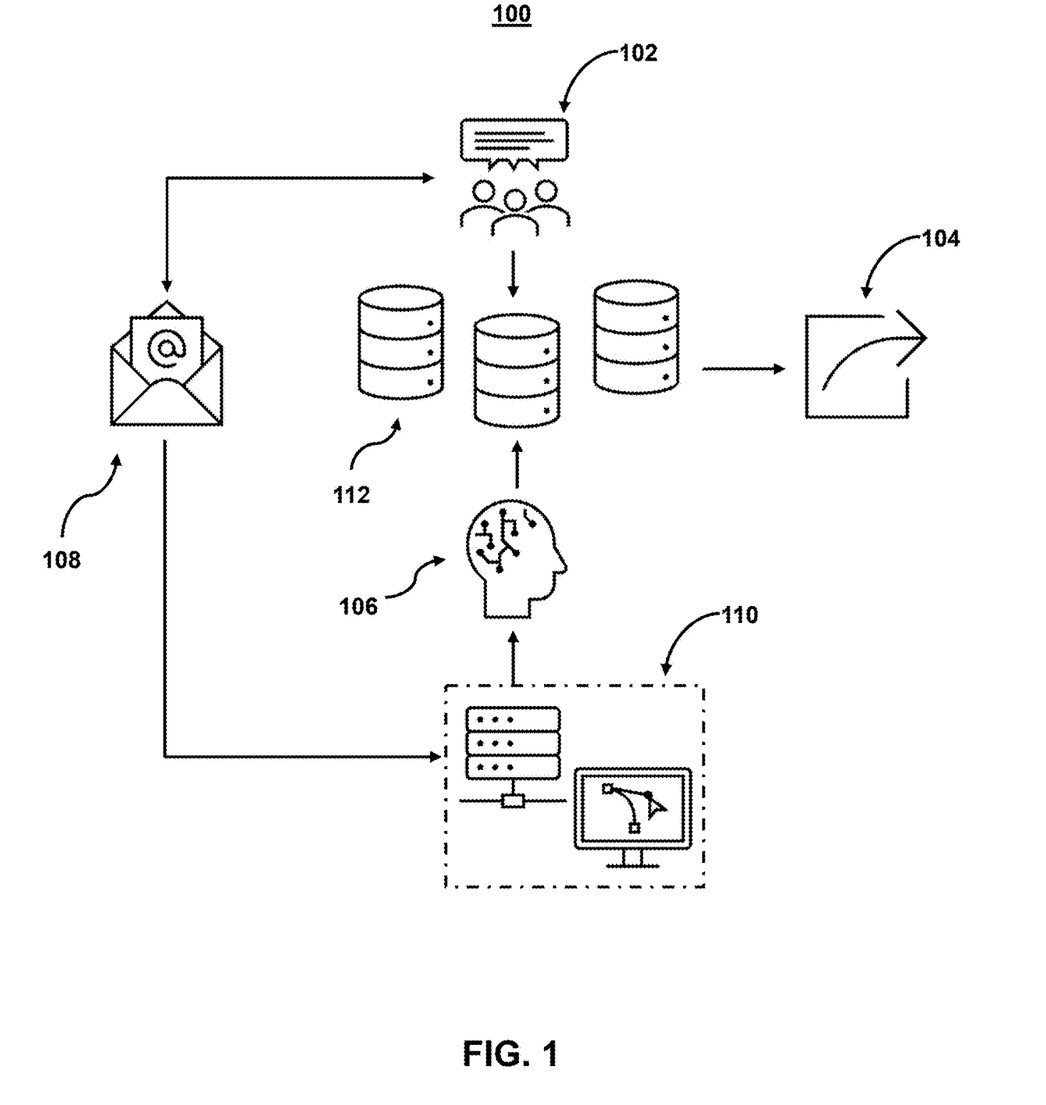
FIG. 1 shows an illustrative diagram for a computer network using a standardizing relay, in accordance with one or more embodiments.

FIG. 1 shows an illustrative diagram for a computer network using a standardizing relay, in accordance with one or more embodiments. For example, FIG. 1 shows cloud computer network 100. Cloud computer network 100, often referred to simply as a cloud network, may be an infrastructure that combines cloud computing and networking technologies to deliver network services, resources, and/or applications from the cloud. Cloud computer network 100 may include various components that may include software, hardware, and/or network components. For example, cloud computer network 100 may include virtual networks, which are programmatically configured networks that allow for the creation of isolated networks within the cloud. They enable users to connect cloud services and virtual machines in a secure and flexible manner. Cloud computer network 100 may include cloud resources and services, which may include servers, storage, applications, and/or services hosted in the cloud infrastructure. Users (e.g., users 102) can access these resources on-demand, scaling them according to their needs without worrying about the underlying physical infrastructure. Cloud computer network 100 may include connectivity services such as site-to-site VPNs (Virtual Private Networks), dedicated leased lines (such as AWS Direct Connect or Azure ExpressRoute), and internet-based connections to facilitate secure and reliable access to cloud resources from anywhere in the world. Cloud computer network 100 may also include management and security services, which may be a suite of management tools for network configuration, performance monitoring, and security management including firewall configurations, intrusion detection systems, and data encryption to ensure safe and efficient network operations.

Cloud computer network 100 may provide one or more applications and/or facilitate communications between one or more applications. Applications in a cloud computer network, often referred to as cloud applications or cloud apps, are software programs that perform specific functions and are designed to operate in a cloud computing environment. Unlike traditional applications that are deployed on local servers or personal computers, cloud applications are hosted on remote cloud infrastructure, making them accessible over the internet from anywhere and at any time. These applications leverage cloud computing resources, such as computing power and storage, to provide a range of services to end-users and businesses. Cloud applications may be structured as Software as a Service (SaaS), Platform as a Service (PaaS), and/or Infrastructure as a Service (IaaS). SaaS is a form of cloud applications where the software is hosted on remote servers and accessed through the web. PaaS provides a platform allowing customers to develop, run, and manage applications without the complexity of building and maintaining the infrastructure typically associated with developing and launching an app. While IaaS is more about providing virtualized computing resources over the internet, applications running on IaaS infrastructure are fully controlled and managed by the user.

Cloud computer network 100 may allow applications to communicate with each other and with users (e.g., users 102) through a variety of messages and data formats, depending on the nature of the application, the underlying architecture, and the specific requirements of the interaction. This communication is crucial for the functionality of distributed systems, where different components may be spread across multiple cloud environments or between cloud and on-premises infrastructure. In particular, cloud computer network 100 may use application programming interface (API) calls, remote procedure calls (RPC), and/or messaging and queuing protocols to exchange communications.

For example, API Calls may include RESTful API calls using HTTP methods (GET, POST, PUT, DELETE) to request data or perform operations on resources. Alternatively or additionally, unlike REST, which operates on the resource level, GraphQL queries may be used, which allow clients to specify exactly what data they need, reducing over-fetching and under-fetching issues. The system may also use SOAP (Simple Object Access Protocol) messages, which is based on a protocol for exchanging structured information in the implementation of web services in computer networks. It uses XML for its message format. Applications that require real-time data sharing or streaming can use protocols like WebSockets for full-duplex communication over a single long-lived connection, facilitating live data feeds, chat applications, and more.

Cloud network 100 may transmit any type of content. As referred to herein, "content" should be understood to mean an electronically consumable user asset, such as Internet content (e.g., streaming content, downloadable content, Webcasts, etc.), video clips, audio, content information, pictures, rotating images, documents, playlists, websites, articles, books, electronic books, blogs, advertisements, chat sessions, social media content, applications, games, and/or any other media or multimedia and/or combination of the same. Content may be recorded, played, displayed, or accessed by user devices, but can also be part of a live performance. Furthermore, user generated content may include content created and/or consumed by a user (e.g., user 102). For example, user generated content may include content created by another, but consumed and/or published by the user.

In some embodiments, the system may monitor content generated by the user to generate user profile data. As referred to herein, "a user profile" and/or "user profile data" may comprise data actively and/or passively collected about a user. For example, the user profile data may comprise content generated by the user and a user characteristic for the user. A user profile may be content consumed and/or created by a user.

User profile data may also include a user characteristic. As referred to herein, "a user characteristic" may include about a user and/or information included in a directory of stored user settings, preferences, and information for the user. For example, a user profile may have the settings for the user's installed programs and operating system. In some embodiments, the user profile may be a visual display of personal data associated with a specific user, or a customized desktop environment. In some embodiments, the user profile may be digital representation of a person's identity. The data in the user profile may be generated based on the system actively or passively monitoring.

As shown in FIG. 1, user 102 may initiate a communication (e.g., communication 108) and/or participate in an exchange of communications. In response, the system may receive, at standardizing relay 110, communication 108. A "standardizing relay" for inter-application communications in a cloud computing network may refer to a common, standardized platform, and/or service that facilitates and manages the communication between different applications, services, and/or microservices across the cloud. The standardizing relay may facilitate communications where components might be deployed across different environments, requiring a unified and efficient way to interact. The goal of such a relay is to provide a consistent, secure, and scalable means of communication that abstracts the underlying complexities and differences between the communicating entities.

Standardizing relay 110 may provide a dynamic communication coordination system based on intelligent and personalized communications. For example, as opposed to a conventional routing system, where the router receives a communication and determines an intended recipient as defined by the communication, the system described herein receives a communication and processes the data in that communication using a standardizing relay. Standardizing relay 110 may then determine where to send the communication.

Communication 108 may comprise vector data and standardizing relay 110 may be accessible to and/or integrated with a vector database. Unlike raster data, which represents data as a grid of individual pixels, vector data uses mathematical equations to describe shapes and their attributes. This fundamental difference makes vector data especially useful for applications that require scalability and precision. A vector database is a type of database designed specifically for storing, querying, and managing vector data, which represents information using geometric constructs such as points, lines, polygons, and multi-dimensional vectors. Unlike traditional databases that are optimized for scalar data (numbers, strings, dates, etc.), vector databases may be engineered to efficiently handle vector data, which can include geometric shapes for applications or high-dimensional vectors used in machine learning and search applications, particularly for similarity search in feature vectors.

Communication 108 may be received in a vector format, from a first component (e.g., user 102) in a cloud computer network, wherein the first communication has an undesignated recipient, wherein the first communication comprises an inter-application communication for the cloud computer network, and wherein the first communication comprises a first body portion and a first header portion. The header portion of communication 108 may be designed to contain metadata about the message being sent. This metadata can include a variety of information crucial for the proper handling and interpretation of the message, such as: content type (e.g., specifying the type of data being transmitted (e.g., application/json, application/xml for text-based data, or application/octet-stream for binary data)), content length (e.g., indicating the size of the body portion, which can be critical for parsing the message correctly), encoding (e.g., information about the encoding used for the data (e.g., UTF-8 for text data)), authorization information (e.g., credentials or tokens required for authenticating the source of the message), protocol version (e.g., indicating the version of the communication protocol being used), timestamps (e.g., indicating a time when the message was sent), and/or other information for routing (e.g., details about the potential sender, potential receiver, or any intermediaries the message might pass through). For example, the system may identify vector data in the first communication corresponding to the first header portion and determine the first key value based on the vector data.

The body portion of communication 108 may carry the actual content or payload that needs to be transmitted. The body's format and structure depend largely on the type of data being transmitted and the specifications of the communication protocol or API being used. For vector data, it is crucial that the body is structured in a way that preserves the integrity and accuracy of the vector representations, whether that involves encoding the data as JSON, XML, binary formats, or using specialized data serialization protocols like Protocol Buffers or Avro. For example, communication 108 may be structured as a feature vector, which includes arrays of numerical values representing the features of an item, image, document, and/or user preference.

The system may determine, at standardizing relay 110, a first communication characteristic, wherein the first characteristic comprises data retrieved from the first body portion of the first communication. A characteristic may be an any attribute of data that distinguishes it from other data. For example, vector data may be composed of basic geometric shapes or primitives. As such its characteristics may comprise points, lines, and/or polygons. Points represent specific locations in space. In Geographic Information Systems (GIS), for example, a point could denote the location of a landmark. Lines connect two or more points. In mapping, lines could represent streets, rivers, or political boundaries. Polygons are closed shapes formed by connecting lines. Polygons can represent areas like lakes, city boundaries, or other regions.

The system may also determine a first key value, wherein the first key value uses a vector-based protocol specific to the standardizing relay, and wherein the first key value is retrieved from the first header portion of the first communication. In communications involving a vector database, a key value plays a crucial role in indexing, retrieving, and/or managing vector data within the database. Vector databases are designed to handle high-dimensional data, typically represented as vectors, which are arrays of numbers that can encapsulate various types of data, including images, text, and complex numerical data. The key value serves as a unique identifier for each vector or data point stored in the database, facilitating efficient operations such as insertion, query, update, and deletion.

The key value uniquely identifies each vector in the database, making it possible to retrieve or manipulate the specific data point directly without having to search through the entire dataset. Key values allow vector databases to efficiently index the high-dimensional vectors, enabling fast and accurate search capabilities. When a query is performed, the database uses the key value to quickly locate and return the relevant vectors. Beyond simply identifying vectors, key values can be used to associate metadata with each vector. This metadata might include information about the vector's source, creation date, or any other contextual information that enhances the utility of the stored data. In some applications, key values can be used to establish relationships between vectors or between vectors and other data types stored in the database or external systems. This is particularly useful in complex applications such as recommendation systems or network analysis. Key values can be strings, integers, or any other data type that supports unique identification. The choice of data type for key values depends on the specific requirements of the application and the design of the vector database.

Standardizing relay 110 may use a vector-based protocol specific to standardizing relay 110. The vector-based protocol may be standardized and facilitate communication in systems that may involve vector data or require the relay of complex data types between applications. Standardizing relay 110 may process the first key value using a vector database by comparing the first key value to a relay rule set in the vector database to generate a first feature of a first feature input.

For example, standardizing relay 110 may receive a key value as part of a request or data packet. This relay acts as an intermediary, standardizing and directing communications within the cloud network, ensuring that data is appropriately routed based on predefined rules or logic. Upon receiving the key value, the relay consults a rule set defined within a vector database. This rule set could specify how different key values or types of data should be processed, including identifying which database operations to perform or which downstream services should handle the data. The comparison could involve matching the key value against specific patterns, ranges, or criteria defined within the rule set, determining how the data is related to the vectors stored in the database.

Based on the rules matched, the relay may query a vector database to retrieve or process vector data associated with the key value. Vector databases are optimized for handling high-dimensional data, and they can perform operations like similarity searches, nearest neighbor searches, or specific vector retrievals efficiently. This step could involve fetching a vector (or set of vectors) that corresponds to the key value, possibly to be used in further processing or analysis.

With the relevant vector data retrieved from the database, the system then applies predefined logic or algorithms to generate a feature of a feature input. This process could involve machine learning models, data transformation algorithms, or other computational methods designed to extract or compute features from the vector data. The nature of the feature may depend on the application domain and the specifics of the processing logic. In a machine learning context, for example, this could involve generating a feature vector that represents key characteristics or patterns found in the retrieved data. After generating the feature and/or the feature input, the system might further process the data, store it for future use, and/or send it as a response to the initial request. This could involve additional computations, entering the data into a workflow for further analysis, or using the generated feature as input for downstream processes or decision-making systems.

The system may submit the feature input to generative artificial intelligence model 106 to generate an output that may be directed to one or more subordinate models, databases, and/or components (e.g., components 112). The output may be used to generate dynamic request 104. For example, the system starts by receiving or generating a feature input, which is a set of data or parameters designed to be processed by generative artificial intelligence model 106. This input may come from various sources beyond standardizing relay 110, such as user requests, sensor data, and/or internal system metrics. The feature input is submitted to generative artificial intelligence model 106. Generative models are designed to generate new data instances that resemble the training data, but they can also be used to predict or infer outputs based on the inputs they receive.

Generative artificial intelligence model 106 processes the input and generates an output. This output could be a direct response, such as a textual answer, an image, or a set of parameters, or it could be an instruction for further action within the system. The output from generative artificial intelligence model 106 is analyzed by the system to determine the appropriate next steps. This could involve simple rule-based logic, or more complex AI-driven decision-making processes. Based on this analysis, the system generates a dynamic request. This request is dynamic in that its content and the recipient are determined based on the output of the generative artificial intelligence model 106 and possibly other contextual factors.

The system then generates dynamic request 104. The dynamic request includes information that designates another component within the cloud computer network as the recipient. This could be another model (subordinate model), a database where the data needs to be stored or retrieved from, or another system component that must perform a specific task. The determination of the recipient could be based on predefined rules (e.g., if the output meets certain criteria, send the request to Component A; otherwise, send it to Component B), or it could involve another layer of AI-driven decision-making to select the best recipient based on current system state, output content, or other factors. For example, inputting the first feature input into the generative artificial intelligence model to generate the first output may comprise clustering the first feature input based on the first feature, selecting a subordinate model, from a plurality of subordinate models of the generative artificial intelligence model, based on the first feature, and processing the first feature input using the sub-component.

Once the dynamic request and its recipient have been defined, the system routes the request to the designated component within the cloud computer network. This routing could be managed by an orchestration layer within the cloud infrastructure, which handles inter-service communication and ensures that messages are securely and efficiently delivered to their destinations.

The recipient component receives the request and performs the designated action, which could involve processing the request further, storing or retrieving data, or generating additional outputs to be sent back to the original system or forwarded to other components. Depending on the system's architecture and the specific workflow, the action taken by the recipient component might generate further data or responses that need to be processed, either by returning them to the original model, by engaging other components in the system, or by generating a response to the end-user or system that initiated the process.

Figure 2:
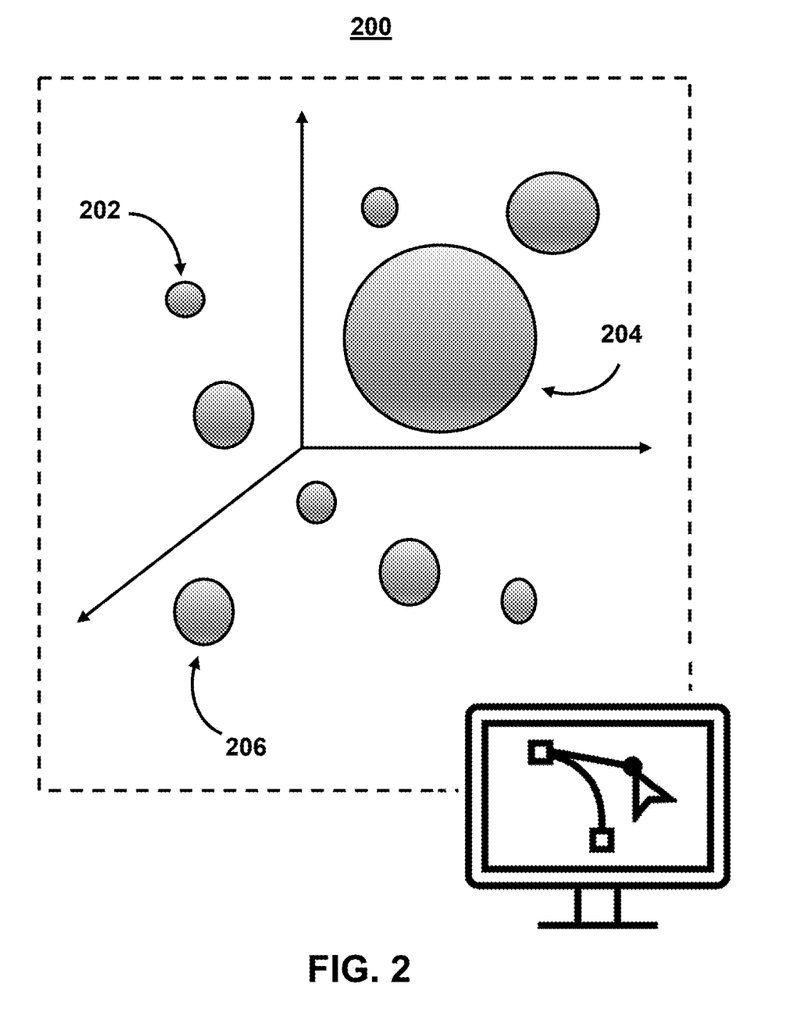
FIG. 2 shows an illustrative diagram of a vector database for powering a standardizing relay, in accordance with one or more embodiments.

In some embodiments, the standardizing relay may comprise a plurality of records. Each record may correspond to a processing request, task, and/or identified communication. For example, FIG. 2 shows an illustrative diagram of a vector database for powering a standardizing relay, in accordance with one or more embodiments. For example, diagram 200 may represent a vector database used by standardizing relay 110 (FIG. 1). As shown in FIG. 2, diagram 200 includes points 202, 204, and 206. Points 202, 204, and 206 may correspond to different components, tasks, and/or other data used to generate dynamic requests. For example, the vector database may map points, lines, and polygons in a vector database to tasks, components, and/or other data for generating dynamic requests in a cloud computer network. To do so, the system may leverage both the spatial attributes of the vector data and the logical or functional requirements of the system.

For example, spatial entities may be stored in a vector database, where points might represent locations (e.g., IoT device locations, service centers, tasks, specific applications, etc.), lines may denote routes or connections (e.g., workflows, function routines, etc.), and polygons may represent bounded areas of overlapping functionality and/or applications (e.g., services provided, functions required, resources, etc.). The system components might include various services and microservices in the cloud, such as data processing units, analytics services, task schedulers, notification services, and more. Tasks could range from data analysis, resource allocation, maintenance scheduling, to customer notifications. Each vector entity can be associated with metadata that describes its attributes or characteristics, such as name, type, capacity, or any relevant operational data.

The mapping process involves creating associations between the vector entities (and their attributes) and the specific components or tasks within the system. Using spatial queries to identify vector entities that meet specific criteria (e.g., polygons within a certain distance from a point) and triggering tasks or alerts based on these queries. The metadata associated with vector entities can be used to route requests to the appropriate system components. For example, a "high-priority" area (polygon) might trigger more frequent data analyses or resource checks. Vector data changes or spatial events (like entering a new area) can generate events that are processed by an event-driven architecture, dynamically invoking relevant tasks or services.

Based on the mapping and the current state of the vector data, dynamic requests are formulated. These requests are tailored to the current needs and conditions as dictated by the spatial data and its attributes. For example, a service request might be generated for a component responsible for maintenance if a point representing an asset falls within a line or polygon denoting areas due for inspection. In another example, data analysis tasks could be dynamically adjusted based on the changing attributes of areas represented by polygons, such as increasing traffic flow or environmental conditions.

The dynamic requests may then be communicated within the cloud computer network, using cloud services for routing, load balancing, and executing the requests. This may involve API calls (e.g., to services or microservices responsible for handling specific types of requests), message queues (e.g., for decoupling request generation from processing, ensuring scalability and fault tolerance), workflow orchestration (e.g., using cloud-based workflow orchestration services to sequence multiple tasks or service calls based on the dynamic requests). The system can incorporate feedback mechanisms, where the outcome of tasks or the status of components influences subsequent spatial queries and the generation of dynamic requests. This creates a responsive and adaptive system that can adjust to real-world changes and data updates.

For example, task clusters can be represented by associating spatial data with non-spatial attributes that define the characteristics and requirements of the tasks. This approach leverages the strengths of vector data in handling geometric shapes—points, lines, and polygons—to not only represent physical locations or areas but also to encapsulate the logical grouping of tasks based on geographic proximity, task type, or other criteria. Task clusters are groups of tasks that are logically or geographically related. In a spatial context, these clusters can be determined by factors such as: geographic proximity (e.g., tasks that are located close to each other), similarity in task type (e.g., tasks that share similar objectives or operational requirements), and/or resource allocation (e.g., tasks that can be addressed by the same resources or teams).

Each task within a cluster can be represented as a point, where each point's coordinates denote the task's geographic location. The metadata (attributes) associated with each point can detail the task type, priority, deadline, resources required, and any other pertinent information. Task clusters themselves can be represented as polygons that encompass all tasks within the cluster. These polygons can be manually defined based on geographic boundaries or generated algorithmically by analyzing the spatial distribution of tasks (e.g., through spatial clustering algorithms like DBSCAN or K-means clustering adapted for geographic data). In scenarios where tasks are part of a linear process or follow a specific route (e.g., inspection tasks along a pipeline), lines can represent the sequence of tasks. Each segment or node in the line can correspond to individual tasks or sub-clusters of tasks.

Each vector entity (point, line, polygon) that represents a task or cluster of tasks is associated with metadata that defines: the nature of the tasks (e.g., maintenance, inspection, delivery), the status of tasks (e.g., pending, in progress, completed), prioritization or categorization of tasks, resources assigned or required for the tasks, timeframes or deadlines for task completion. With tasks and task clusters represented in a vector database, spatial queries can be used to identify tasks within a specific cluster, determine the proximity between tasks or clusters and resources (such as service centers or equipment depots), and/or plan workflows, routines, processing routes and/or allocate resources efficiently by analyzing the spatial distribution and characteristics of task clusters. As tasks are added, completed, or updated, the representation of task clusters in the vector database can be dynamically adjusted. This ensures that the spatial representation remains accurate and relevant, supporting ongoing operational decision-making.

Figure 3:
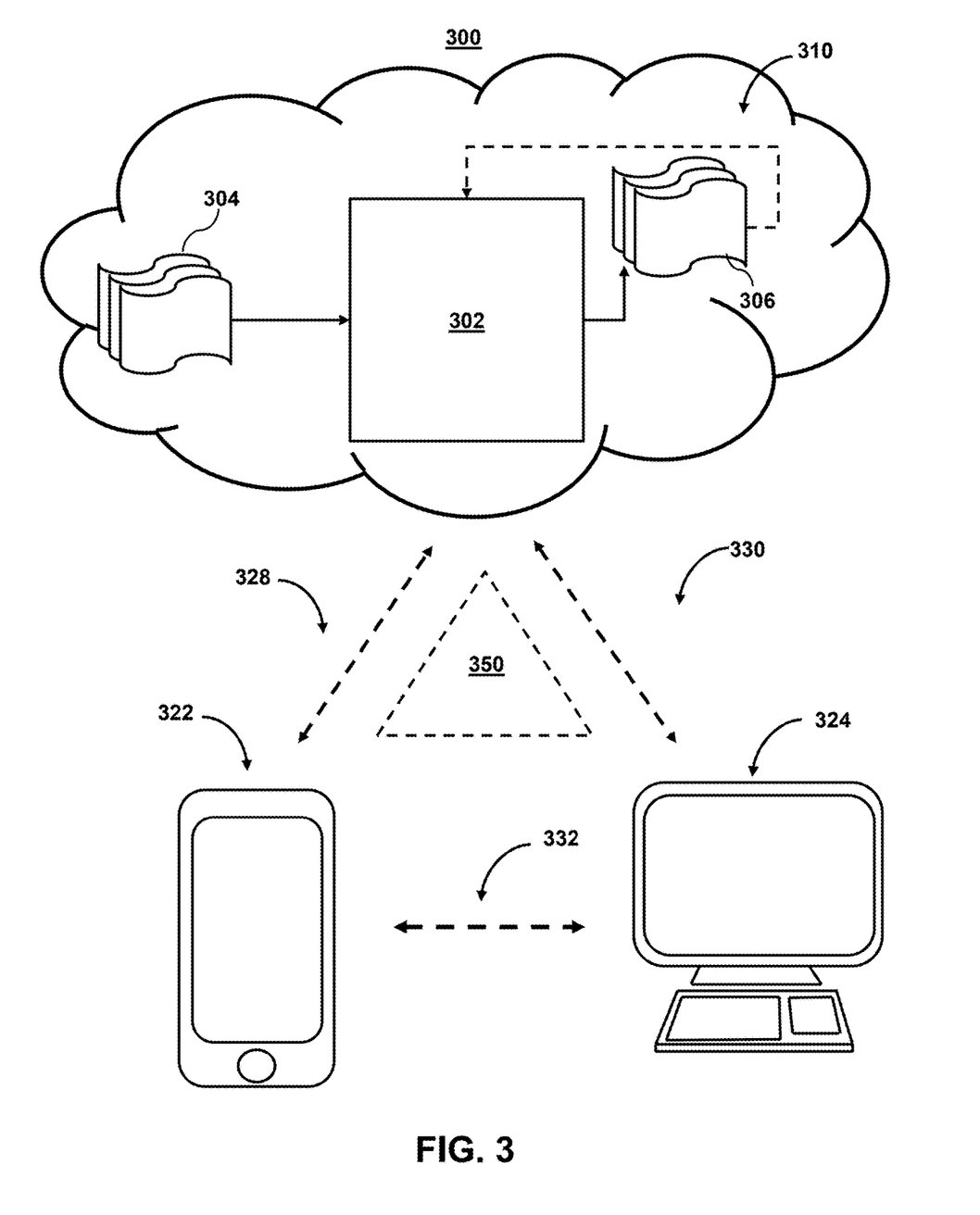
FIG. 3 shows illustrative components for a system used to generate dynamic requests and responses, in accordance with one or more embodiments.

FIG. 3 shows illustrative components for a system used to generate dynamic requests and responses, in accordance with one or more embodiments. For example, FIG. 3 may show illustrative components for use by a standardizing relay. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system, and may feature one or more component devices. It should also be noted that system 300 is not limited to three devices. Users may, for instance, utilize one or more devices to interact with one another, one or more servers, or other components of system 300. It should be noted, that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., responses, queries, and/or notifications).

Additionally, as mobile device 322 and user terminal 324 are shown as touchscreen smartphones, these displays also act as user input interfaces. It should be noted that in some embodiments, the devices may have neither user input interfaces nor displays, and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include model 302, which may be a machine learning model, artificial intelligence model, etc. (which may be referred collectively as "models" herein). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., dynamic requests).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., a recipient of a dynamic request).

In some embodiments, the model (e.g., model 302) may automatically perform actions based on outputs 306. In some embodiments, the model (e.g., model 302) may not perform any actions. The output of the model (e.g., model 302) may be used to provide a dynamic communication coordination system based on intelligent and personalized communications.

In some embodiments, model 302 may be a generative artificial intelligence model. A generative artificial intelligence model is a type of model designed to generate new data that resembles the training data, but is not an exact copy. This contrasts with discriminative models, which are used to classify input data or predict a label from input features. Generative models capture and learn the underlying probability distribution of the training data, enabling them to produce novel content that shares properties with the original dataset. They can generate new data instances that mimic the original training data in form and feature. This can include text, images, music, speech, and even video. Generative models learn the probability distribution of the training data, which allows them to produce outputs that are similar to, but distinct from, the data they were trained on. Beyond data generation, they are used in a variety of tasks such as data augmentation, unsupervised learning, semi-supervised learning, and more complex applications like style transfer, image-to-image translation, and drug discovery.

In some embodiments, model 302 may comprise Generative Adversarial Networks (GANs), which comprise two models, a generator and a discriminator, that are trained simultaneously. The generator tries to produce data that is indistinguishable from real data, while the discriminator tries to distinguish between real and generated data. This adversarial process improves the quality of the generated data over time. In some embodiments, model 302 may comprise Variational Autoencoders (VAEs), which are designed to encode input data into a compressed representation and then reconstruct the input data from this representation. During this process, they learn to generate new data that is similar to the training data. In some embodiments, model 302 may comprise autoregressive models, such as RNNs (Recurrent Neural Networks) and transformers used in natural language processing, predict the next element in a sequence (like a word in a sentence) based on the previous elements. They can be used to generate coherent and contextually relevant text sequences or other sequential data.

System 300 also includes API layer 350. API layer 350 may allow the system to generate summaries across different devices. In some embodiments, API layer 350 may be implemented on mobile device 322 or user terminal 324. Alternatively or additionally, API layer 350 may reside on one or more of cloud components 310. API layer 350 (which may be A REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web-services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying WAF and DDOS protection, and API layer 350 may use RESTful APIs as standard for external integration.

Figure 4:
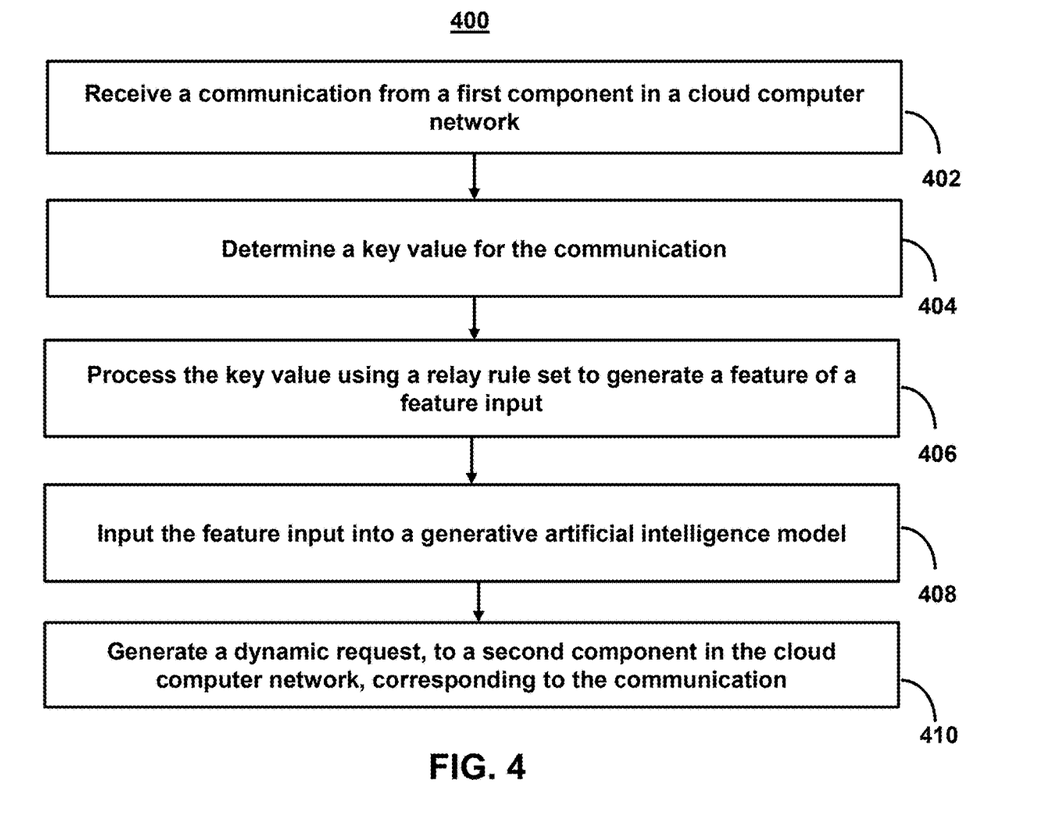
FIG. 4 shows a flowchart of the steps involved in generating dynamic requests and responses for inter-application communications, in accordance with one or more embodiments.

FIG. 4 shows a flowchart of the steps involved in generating dynamic requests and responses for inter-application communications, in accordance with one or more embodiments. For example, the system may use process 400 (e.g., as implemented on one or more system components described above) in order to generate dynamic requests and responses for inter-application communications without predetermined recipients within cloud computer networks. For example, process 400 may be undertaken when a component in the cloud network sends a first communication that lacks a designated recipient, whereby the message is intended for dynamic resolution based on the content of the message, context, and/or other criteria rather than being addressed to a specific destination from the outset. For example, process 400 may use a vector database that is specialized in storing and querying vectors, which are arrays of numbers. Process 400 may further use a standardizing relay, which may be a middleware component or service that standardizes and routes communications or messages within the cloud computing network. It acts as an intermediary, receiving messages from various components, standardizing or transforming these messages if necessary, and then forwarding them to the appropriate recipients.

At step 402, process 400 (e.g., using one or more components described above) receives a communication from a first component in a cloud computer network. For example, the system may receive, at a standardizing relay accessible to and/or integrated with a vector database, a first communication from a first component in a cloud computer network, wherein the first communication has an undesignated recipient. For example, a component may generate a message or communication intended for processing but that does not specify a recipient. The message may be sent to the standardizing relay, which may be configured to receive all such undirected communications. The standardizing relay may ensure that the message meets certain criteria or protocols, convert the message into a standardized format if necessary, making it compatible with downstream processes or systems, and/or determine the appropriate recipient for the message based on its content, context, or other routing rules. This could involve querying a vector database to find the best match based on the message's characteristics.

At step 404, process 400 (e.g., using one or more components described above) determines a key value for the communication. For example, the system may determine, at the standardizing relay, a first key value, wherein the first key value uses a vector-based protocol specific to the standardizing relay. For example, the standardizing relay receives a communication, which could be in a vector format, and might include data from various sources within the cloud computing network. Additionally or alternatively, the system may determine, at the standardizing relay, a first communication characteristic. The relay may parse the received message to understand its structure and content. This step is crucial for extracting relevant information, including potential key values. The system may use parsing that is flexible to accommodate different message formats (e.g., locations within a vector array). The relay may look for specific fields, values in an array, locations in an array, etc. in the communication that are pre-defined as significant. For example, in a vector array, the relay might extract the value associated with a specific key or group of values, where the key value of interest is likely to be. In some embodiments, the relay may use natural language processing or other machine learning techniques to infer the key value from the message content. For example, it could analyze a text message to identify a characteristic (e.g., a reference number or a specific intent) that is not explicitly labeled. In some embodiments, the extracted key value might need to be transformed or standardized to match the format expected by downstream processes or systems. For instance, the relay might convert a date from one format to another or might hash a user ID for privacy reasons.

At step 406, process 400 (e.g., using one or more components described above) processes the key value using a relay rule set to generate a feature of a feature input. For example, the system may process, at the standardizing relay, the first key value using a relay rule set in a vector database to generate a first feature of a first feature input. Additionally or alternatively, the system may generate, at the standardizing relay, a second feature for the first feature input based on the first communication characteristic. For example, processing the first key value using the relay rule set in the vector database to generate the first feature of the first feature input may comprise the system inputting the first key value into the relay rule set in the vector database, receiving a vector output from the vector database and generating the first feature based on the vector output.

For example, once the message is parsed, the relay analyzes its content to identify significant data points. This analysis can be rule-based (where certain fields or patterns are looked for explicitly) or more dynamic (involving machine learning models to understand the message's context or intent). The standardizing rely may use the key value or characteristic for a plurality of purposes such as routing (e.g., directing the message to the appropriate recipient based on the key value), aggregation (e.g., grouping messages based on key values for batch processing) and/or filtering (e.g., deciding whether a message should be forwarded or discarded based on its key value).

The standardizing relay receives a communication that includes or results in the determination of a key value. This key value is crucial for the subsequent processing and is derived from the initial communication as previously described. For example, the relay rule set is a collection of predefined rules stored within a vector database. These rules dictate how key values should be processed to generate feature inputs. The standardizing relay queries the vector database with the first key value to retrieve the applicable relay rule(s). These rules may include direct mappings from key values to feature inputs, transformation functions to apply to the key value, and/or criteria for selecting specific features or operations based on the key value.

Once the relevant rules are retrieved, the standardizing relay processes the first key value according to these rules. This process might involve several steps, such as transformation (e.g., applying mathematical or logical operations to transform the key value), lookup (e.g., using the key value to lookup additional information in the vector database or another database that is necessary for generating the feature input), and/or combination (e.g., combining the key value with other data, possibly retrieved during the lookup step, to produce a more complex feature input. The result of processing the key value with the relay rule set is the generation of the first feature. This feature is an input to a subsequent system or model, designed to be utilized in further processing, analysis, or decision-making. The feature generation step might include encoding or embedding the processed information into a format suitable for machine learning models or other analytical tools, normalizing or scaling the feature input to match the expected input range of downstream processes, and/or aggregating multiple pieces of information into a single feature, if the relay rules dictate such an action.

At step 408, process 400 (e.g., using one or more components described above) inputs the feature input into a generative artificial intelligence model. For example, the system may input the first feature input into a generative artificial intelligence model to generate a first output. For example, the generated first feature may then ready to be used as part of the first feature input set for further processing. This may involve feeding into a model for prediction, classification, or clustering, serving as input for real-time decision-making systems, and/or contributing to a larger set of features used for complex analyses or operations.

In some embodiments, inputting the first feature input into the generative artificial intelligence model to generate the first output may comprise the system clustering the first feature input based on the first feature, selecting a subordinate model, from a plurality of subordinate models of the generative artificial intelligence model, based on the first feature, and processing the first feature input using the sub-component. For example, the system starts with analyzing the first feature input. This feature input, as generated by preceding processes (such as a standardizing relay), includes critical information necessary for decision-making within the generative model. The first feature is used to cluster the feature input. This could be based on pre-determined clusters that are defined during the model's training phase. Clustering is often used to group data points based on similarity across one or more dimensions. The model may use algorithms like K-means, DBSCAN, or hierarchical clustering, depending on the nature of the features and the desired clustering granularity. Each cluster is associated with one or more subordinate models within the generative model. These subordinate models are specialized sub-components designed to handle specific types of data or tasks, optimized through training to perform best on data similar to that represented by their respective clusters. Based on the cluster into which the first feature input is grouped, the system selects the appropriate subordinate model. This selection is predicated on the understanding that the chosen model is best suited to process inputs with characteristics similar to those of the current feature input. After processing the input, the subordinate model generates an output. This output represents the culmination of the model's analysis, synthesis, or generative processes applied to the initial feature input. In systems with multiple subordinate models, the outputs might be integrated or further processed to produce a final, unified result. This could involve combining outputs, selecting among outputs based on confidence scores, or further refining outputs through additional layers of processing.

In some embodiments, inputting the first feature input into the generative artificial intelligence model to generate the first output may comprise determining a standardizing relay record corresponding to the first communication and updating the standardizing relay record based on the first output. For example, the system identifies or creates a standardizing relay record corresponding to this first communication. This record might include metadata about the communication, such as its source, content, the time of receipt, and any initial processing steps taken. Based on the initial communication and possibly the corresponding standardizing relay record, the system generates the first feature input. This input is prepared in a way that is suitable for analysis by the generative model, possibly involving transformations or extractions of key information from the communication. The first feature input is fed into the generative model. This model processes the input according to its design, which might involve complex operations like natural language understanding, pattern recognition, or other forms of deep learning. The model generates the first output based on the processing of the first feature input. This output could be a decision, a prediction, a recommendation, or any other form of response the model is designed to produce. Before updating the standardizing relay record, the system analyzes the first output to understand its implications for the initial communication or the processing steps. The system updates the standardizing relay record to include information about the first output. This update could involve adding annotations, modifying existing entries to reflect the outcomes of the processing, or appending new data derived from the first output.

In some embodiments, determining the standardizing relay record corresponding to the first communication may comprise the system comparing the first communication characteristic to a plurality of standardizing relay records and selecting the standardizing relay record from the plurality of standardizing relay records based on comparing the first communication characteristic to the plurality of standardizing relay records. For example, the system may extract the first communication characteristic. This characteristic could be any identifiable feature of the communication, such as a times stamp, keyword, phrase, sender ID, transaction type, or even more complex features extracted through analysis (e.g., sentiment, topic classification). The system accesses a database or repository where the standardizing relay records are stored. These records contain historical data, metadata, or summaries of previous communications processed by the system. The extracted characteristic is compared against those stored within the plurality of standardizing relay records. This comparison can be straightforward (e.g., a direct match) or complex. Based on the comparison, the system identifies the standardizing relay record(s) that best match the first communication characteristic.

In some embodiments, determining the standardizing relay record corresponding to the first communication may comprise determining a time stamp corresponding to the first communication and selecting the standardizing relay record from a plurality of standardizing relay records based on the time stamps. For example, the system may determine to update records (and/or order the records) based on how recent a communication is received.

In some embodiments, generating the first output may comprise the system determining a plurality of tasks corresponding to the first communication and generating a respective dynamic request for each of the plurality of tasks. For example, the system may generate tasks for various functions to be performed based on a single communication.

At step 410, process 400 (e.g., using one or more components described above) generates a dynamic request, to a second component in the cloud computer network, corresponding to the communication. For example, the system may generate a first dynamic request corresponding to the first communication based on the first output, wherein the first dynamic request designates a second component in the cloud computer network as a recipient. For example, once the appropriate recipient is determined (which could be another component within the cloud network, a database, or an external service), the relay forwards the message to that recipient for further processing or action.

In some embodiments, generating the first dynamic request may comprise the system determining a standardizing relay record corresponding to the first communication and updating the standardizing relay record based on the first dynamic request. For example, updating the standardizing relay record based on the first dynamic request may comprise the system recording the second component in the cloud computer network as the recipient in the standardizing relay record and recording a task record for the first communication in the standardizing relay record.

In some embodiments, generating the first dynamic request may comprise the system generating a private-public key-pair for the first dynamic request and transmitting a private key portion of the private-public key pair to the second component. For example, the system may receive a first dynamic request that triggers the need for a new key pair. This request could come from a user, a device, or an internal process indicating the initiation of a secure operation. The system utilizes a cryptographic algorithm to generate a new private-public key pair. Common algorithms used for this purpose include RSA (Rivest-Shamir-Adleman), ECC (Elliptic Curve Cryptography), and others, depending on the security requirements and computational constraints. The public key may be meant to be shared openly and used by others to encrypt data sent to the key's owner or to verify a digital signature made with the corresponding private key. The private key may be kept secret by the owner and used to decrypt data encrypted with the public key or to create a digital signature.

In some embodiments, generating the first dynamic request corresponding to the first communication may comprise the system generating a first notification corresponding to the first dynamic request and generating for display, on a user interface, the first notification. For example, the notification may include a status of a task and/or other information about a communication.

In some embodiments, generating the first dynamic request corresponding to the first communication based on the first output may comprise the system determining a task of a plurality of tasks for the first dynamic request and selecting the second component from a plurality of components based on the task. For example, the system may generate a plurality of tasks for different components based on a single communication.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for generating dynamic requests and responses for inter-application communications without predetermined recipients within cloud computer networks.

2. A method of the preceding embodiment, the method comprising: receiving, at a standardizing relay, a first communication from a first component in a cloud computer network, wherein the first communication has an undesignated recipient; determining, at the standardizing relay, a first communication characteristic; determining, at the standardizing relay, a first key value, wherein the first key value uses a vector-based protocol specific to the standardizing relay; processing, at the standardizing relay, the first key value using a relay rule set in a vector database to generate a first feature of a first feature input; generating, at the standardizing relay, a second feature for the first feature input based on the first communication characteristic; inputting the first feature input into a generative artificial intelligence model to generate a first output; and generating a first dynamic request corresponding to the first communication based on the first output, wherein the first dynamic request designates a second component in the cloud computer network as a recipient.

3. The method of any one of the preceding embodiments, wherein processing the first key value using the relay rule set in the vector database to generate the first feature of the first feature input comprises: inputting the first key value into the relay rule set in the vector database; receiving a vector output from the vector database; and generating the first feature based on the vector output.

4. The method of any one of the preceding embodiments, wherein receiving the first communication comprises receiving the first communication in a vector format, wherein the vector format indicates a first body portion and a first header portion for the first communication.

5. The method of any one of the preceding embodiments, wherein determining the first key value further comprises: identifying vector data in the first communication corresponding to the first header portion; and determining the first key value based on the vector data.

6. The method of any one of the preceding embodiments, wherein inputting the first feature input into the generative artificial intelligence model to generate the first output further comprises: clustering the first feature input based on the first feature; selecting a subordinate model, from a plurality of subordinate models of the generative artificial intelligence model, based on the first feature; and processing the first feature input using the sub-component.

7. The method of any one of the preceding embodiments, wherein inputting the first feature input into the generative artificial intelligence model to generate the first output further comprises: determining a standardizing relay record corresponding to the first communication; and updating the standardizing relay record based on the first output.

8. The method of any one of the preceding embodiments, wherein determining the standardizing relay record corresponding to the first communication further comprises: comparing the first communication characteristic to a plurality of standardizing relay records; and selecting the standardizing relay record from the plurality of standardizing relay records based on comparing the first communication characteristic to the plurality of standardizing relay records.

9. The method of any one of the preceding embodiments, wherein determining the standardizing relay record corresponding to the first communication further comprises: determining a time stamp corresponding to the first communication; and selecting the standardizing relay record from a plurality of standardizing relay records based on the time stamp.

10. The method of any one of the preceding embodiments, wherein generating the first dynamic request further comprises: determining a standardizing relay record corresponding to the first communication; and updating the standardizing relay record based on the first dynamic request.

11. The method of any one of the preceding embodiments, wherein updating the standardizing relay record based on the first dynamic request further comprises: recording the second component in the cloud computer network as the recipient in the standardizing relay record; and recording a task record for the first communication in the standardizing relay record.

12. The method of any one of the preceding embodiments, wherein generating the first dynamic request further comprises: generating a private-public key-pair for the first dynamic request; and transmitting a private key portion of the private-public key pair to the second component.

13. The method of any one of the preceding embodiments, wherein generating the first dynamic request corresponding to the first communication further comprises: generating a first notification corresponding to the first dynamic request; and generating for display, on a user interface, the first notification.

14. The method of any one of the preceding embodiments, wherein generating the first output further comprises: determining a plurality of tasks corresponding to the first communication; and generating a respective dynamic request for each of the plurality of tasks.

15. The method of any one of the preceding embodiments, wherein generating the first dynamic request corresponding to the first communication based on the first output further comprises: determining a task of a plurality of tasks for the first dynamic request; and selecting the second component from a plurality of components based on the task.

16. One or more non-transitory, computer-readable mediums storing instructions that, when executed by a data processing apparatus, cause the data processing apparatus to perform operations comprising those of any of embodiments 1-15.

17. A system comprising one or more processors; and memory storing instructions that, when executed by the processors, cause the processors to effectuate operations comprising those of any of embodiments 1-15.

18. A system comprising means for performing any of embodiments 1-15.

What is claimed is:

1. A system for generating dynamic requests and responses for inter-application communications with undesignated recipients within cloud computer networks, the system comprising:
   one or more processors; and
   one or more non-transitory, computer-readable mediums, comprising instructions that, when executed by the one or more processors, cause operations comprising:
   receiving, at a standardizing relay, a first communication, in a vector format, from a first component in a cloud computer network, wherein the first communication has an undesignated recipient, wherein the first communication comprises an inter-application communication for the cloud computer network, and wherein the first communication comprises a first body portion and a first header portion;
   determining, at the standardizing relay, a first communication characteristic, wherein the first characteristic comprises data retrieved from the first body portion of the first communication;
   determining, at the standardizing relay, a first key value, wherein the first key value uses a vector-based protocol specific to the standardizing relay, and wherein the first key value is retrieved from the first header portion of the first communication;
   processing, at the standardizing relay, the first key value using a vector database by comparing the first key value to a relay rule set in the vector database to generate a first feature of a first feature input;
   processing, at the standardizing relay, the first characteristic using the vector database to generate a second feature of the first feature input;
   inputting the first feature input into a generative artificial intelligence model to generate a first output; and
   generating a first dynamic request corresponding to the first communication based on the first output, wherein the first dynamic request designates a second component in the cloud computer network as a recipient.

2. A method for generating dynamic requests and responses for inter-application communications without predetermined recipients within cloud computer networks, the method comprising:
   receiving, at a standardizing relay, a first communication from a first component in a cloud computer network, wherein the first communication has an undesignated recipient;
   determining, at the standardizing relay, a first communication characteristic;
   determining, at the standardizing relay, a first key value, wherein the first key value uses a vector-based protocol specific to the standardizing relay;
   processing, at the standardizing relay, the first key value using a relay rule set in a vector database to generate a first feature of a first feature input;
   generating, at the standardizing relay, a second feature for the first feature input based on the first communication characteristic;
   inputting the first feature input into a generative artificial intelligence model to generate a first output; and
   generating a first dynamic request corresponding to the first communication based on the first output, wherein the first dynamic request designates a second component in the cloud computer network as a recipient.

3. The method of claim 2, wherein processing the first key value using the relay rule set in the vector database to generate the first feature of the first feature input comprises:
   inputting the first key value into the relay rule set in the vector database;
   receiving a vector output from the vector database; and
   generating the first feature based on the vector output.

4. The method of claim 2, wherein receiving the first communication comprises receiving the first communication in a vector format, wherein the vector format indicates a first body portion and a first header portion for the first communication.

5. The method of claim 4, wherein determining the first key value further comprises:
   identifying vector data in the first communication corresponding to the first header portion; and
   determining the first key value based on the vector data.

6. The method of claim 2, wherein inputting the first feature input into the generative artificial intelligence model to generate the first output further comprises:
   clustering the first feature input based on the first feature;
   selecting a subordinate model, from a plurality of subordinate models of the generative artificial intelligence model, based on the first feature; and
   processing the first feature input using the subordinate model.

7. The method of claim 2, wherein inputting the first feature input into the generative artificial intelligence model to generate the first output further comprises:
   determining a standardizing relay record corresponding to the first communication; and
   updating the standardizing relay record based on the first output.

8. The method of claim 7, wherein determining the standardizing relay record corresponding to the first communication further comprises:
   comparing the first communication characteristic to a plurality of standardizing relay records; and
   selecting the standardizing relay record from the plurality of standardizing relay records based on comparing the first communication characteristic to the plurality of standardizing relay records.

9. The method of claim 7, wherein determining the standardizing relay record corresponding to the first communication further comprises:
   determining a time stamp corresponding to the first communication; and
   selecting the standardizing relay record from a plurality of standardizing relay records based on the time stamp.

10. The method of claim 2, wherein generating the first dynamic request further comprises:
    determining a standardizing relay record corresponding to the first communication; and
    updating the standardizing relay record based on the first dynamic request.

11. The method of claim 10, wherein updating the standardizing relay record based on the first dynamic request further comprises:
   recording the second component in the cloud computer network as the recipient in the standardizing relay record; and
   recording a task record for the first communication in the standardizing relay record.

12. The method of claim 2, wherein generating the first dynamic request further comprises:
   generating a private-public key-pair for the first dynamic request; and
   transmitting a private key portion of the private-public key-pair to the second component.

13. The method of claim 2, wherein generating the first dynamic request corresponding to the first communication further comprises:
   generating a first notification corresponding to the first dynamic request; and
   generating for display, on a user interface, the first notification.

14. The method of claim 2, wherein generating the first output further comprises:
   determining a plurality of tasks corresponding to the first communication; and
   generating a respective dynamic request for each of the plurality of tasks.

15. The method of claim 2, wherein generating the first dynamic request corresponding to the first communication based on the first output further comprises:
   determining a task of a plurality of tasks for the first dynamic request; and
   selecting the second component from a plurality of components based on the task.

16. One or more non-transitory, computer-readable media, comprising instructions that, when executed by one or more processors, cause operations comprising:
   receiving, at a vector database, a first communication from a first component in a cloud computer network, wherein the first communication has an undesignated recipient;
   determining, at the vector database, a first key value for the first communication, wherein the first key value uses a vector-based protocol specific to the vector database;
   processing, at the vector database, the first key value using a relay rule set to generate a first feature of a first feature input;
   inputting the first feature input into a generative artificial intelligence model to generate a first output; and
   generating a first dynamic request corresponding to the first communication based on the first output, wherein the first dynamic request designates a second component in the cloud computer network as a recipient.

17. The one or more non-transitory, computer-readable media of claim 16, wherein processing the first key value using the relay rule set in the vector database to generate the first feature of the first feature input comprises:
   inputting the first key value into the relay rule set in the vector database; and
   receiving a vector output from the vector database; and
   generating the first feature based on the vector output.

18. The one or more non-transitory, computer-readable media of claim 16, wherein receiving the first communication comprises receiving the first communication in a vector format, wherein the vector format indicates a first body portion and a first header portion for the first communication.

19. The one or more non-transitory, computer-readable media of claim 18, wherein determining the first key value further comprises:
   identifying vector data in the first communication corresponding to the first header portion; and
   determining the first key value based on the vector data.

20. The one or more non-transitory, computer-readable media of claim 16, wherein inputting the first feature input into the generative artificial intelligence model to generate the first output further comprises:
   clustering the first feature input based on the first feature;
   selecting a subordinate model, from a plurality of subordinate models of the generative artificial intelligence model, based on the first feature; and
   processing the first feature input using the subordinate model.

\* \* \* \* \*